United States Patent
Gil

(10) Patent No.: US 6,267,879 B1
(45) Date of Patent: Jul. 31, 2001

(54) CONTINUOUS LIQUID FILTERING APPARATUS WITH MULTI-LAYER SINTERED FILTERING ELEMENT

(75) Inventor: Shemuel Gil, Kfar-Saba (IL)

(73) Assignee: Odis Irrigation Equipment Ltd., Petach-Tikva (IL)

( * ) Notice: Subject to any disclaimer, the term of this patent is extended or adjusted under 35 U.S.C. 154(b) by 0 days.

(21) Appl. No.: 09/372,175

(22) Filed: Aug. 11, 1999

(51) Int. Cl.[7] .................................................. B01D 25/32
(52) U.S. Cl. ......................... 210/107; 210/335; 210/408; 210/409; 210/414; 210/497.01
(58) Field of Search ................ 210/90, 106, 107, 210/335, 407, 408, 409, 413, 414, 415, 497.01, 416.01; 318/256

(56) References Cited

U.S. PATENT DOCUMENTS

| | | | |
|---|---|---|---|
| Re. 32,537 | * | 11/1987 | Drori . |
| 3,678,355 | * | 7/1972 | Bucek et al. . |
| 3,857,077 | * | 12/1974 | Kasmer . |
| 4,271,018 | * | 6/1981 | Drori . |
| 4,614,581 | * | 9/1986 | Drori . |
| 4,643,828 | * | 2/1987 | Barzuza . |
| 4,880,540 | * | 11/1989 | Frejborg . |
| 5,085,771 | * | 2/1992 | Huang . |
| 5,106,500 | * | 4/1992 | Hembree . |
| 5,198,111 | * | 3/1993 | Davis . |
| 5,228,993 | * | 7/1993 | Dori . |
| 5,268,095 | * | 12/1993 | Barzuza . |

* cited by examiner

Primary Examiner—Joseph W. Drodge
Assistant Examiner—Terry K. Cecil
(74) Attorney, Agent, or Firm—Lowe Hauptman Gilman & Berner, LLP

(57) ABSTRACT

Described is a continuous liquid filtering apparatus having a preliminary filtering chamber 9, a filtering chamber 3, a filtered liquid chamber 12, and an electromechanical cleaning system. In operation, after entering inlet 1, liquid passes through coarse screen 2 into the filtering chamber 3. The liquid then passes through a multi-layer sintered filtering element 4 before exiting the apparatus through the outlet 6. The electromechanical cleaning system includes a hollow connector unit 10 having dirt suctioning members 5 and spraying nozzles 11 for cleaning the sintered filter element. The cleaning system is activated whenever the liquid differential pressure exceeds a predetermined valve indicating that the cylindrical filter requires a cleaning treatment. The spraying nozzles 11 are in fluid communication with the filtered liquid chamber 12 via booster pump 13.

11 Claims, 1 Drawing Sheet

CONTINUOUS LIQUID FILTERING APPARATUS WITH MULTI-LAYER SINTERED FILTERING ELEMENT

FIELD OF THE INVENTION

The present invention relates to a high efficiency continuous liquid filtering apparatus with automatic electromechanical self-cleaning system.

More specifically the present invention relates to an apparatus useful for removing particles from liquids, having a pre-filtering unit equipped with a coarse filter for removing rough particles from the liquid, and a fine filtering unit with a multi-layer sintered filtering element for removing (according to the specific filtering application) particles of between 2 and 500 Microns, and further having an electromechanical self-cleaning unit automatically activated and stopped during the filtration process according to a predetermined sediment blockage level measured at the sintered filtering element.

BACKGROUND OF THE INVENTION

One inevitable problem of many existing filtering systems is the accumulation of sediments on the filtering element during filtration, blocking its porous surface and lowering the filtration rate until totally preventing it. Thus, plain filtration systems have to be treated occasionally by cleaning the used blocked filtering element or by replacing it with a clean one, which means interrupting and stopping the filtration process from time to time.

The present invention focuses on (but not limit itself to) the fields of filtration of liquids, irrigation water, recycling of sewage and industrial waste water, recycling of cooling towers water, filtration and purification of drinking water etc.

The aim of the present invention is to provide a high efficiency continuous liquid filtering apparatus having self-cleaning mechanism allowing the continuous filtering operation, i.e. without interrupting the supply of filtered liquid.

Self-cleaning filter devices are known in the art, but they are not efficient enough—in the filtration rate and in the self-cleaning quality. The filter elements used by the said known in the art devices are comprised of PVC support screens combined with one layer of screen mesh. The filter element void rate in such combination of screens is only about 60% of the filter surface, meaning bulky and inefficient filter element. Another problem in said filter elements is that during the filtration a significant amount of particles are trapped between the PVC support and the mesh, which reduces the cleaning efficiency and further reduces the void rate.

The apparatus of the present invention overcomes the abovementioned disadvantages, and increases the efficiency of the filtration process and the self cleaning of the continuous filtering apparatus, by using a unique combination of a cylindrical multi-layer sintered body of metallic screens as a filtering element, and an electro mechanical self-cleaning system.

Said cleaning system is based on a back and forth helical motion of a dirt collector having dirt suction members equipped with spraying nozzles. The spraying nozzles use the filtered liquid after being pressurized by a booster pump for vibrating and rinsing the sediments accumulated on the sintered filtering element, while the pressure-difference between the pressure of the liquid within the apparatus and the pressure of the free atmosphere outside of the apparatus is utilized as a suction force for the operation of the dirt suction members.

SUMMARY OF THE INVENTION

The present invention relates to a continuous liquid filtering apparatus, comprising;

a preliminary filtering chamber having a liquid inlet and a coarse filtering screen; a final filtering chamber having a cylindrical multi-layer sintered filtering element in liquid communication with said preliminary filtering chamber across said coarse filtering screen; a filtered liquid chamber in liquid communication with said final filtering chamber across said sintered filtering element and having a liquid outlet; an electromechanical cleaning system adapted to remove sediments from the sintered filtering element; and controlling means for activating the said cleaning system during the filtration process, for limited periods (according to one operation mode) or continuously (according to another operation mode).

In the context of the present invention the term "multi-layer sintered filtering element" relates to any type of metallic body constructed from a plurality of metal screens of different densities or patterns, or of a plurality of metal wires, sintered together for being one integral metallic body useful for the filtration of particles from a substance flowing across its multi layers.

According to one preferred embodiment of the present invention the cleaning system is consisting of (a) a collector unit comprised of a pipe having an open end for dirt draining positioned along the line of symmetry of the cylindrical filter and further having a plurality of dirt suction members spaced from each other along the pipe length each equipped with a spraying nozzle, both suction member and nozzle extend to the inner circumference of the cylindrical filter; (b) a bidirectional electrical motor connected through a helical driving mechanism to the said collector unit for simultaneously revolving it and moving it slowly along the cylindrical filter back and forth; (c) a switching arrangement adapted to invert the motor rotation direction at the limits of said back and forth movement; (d) a booster-pump having a liquid inlet fed with filtered liquid from the fine filtering chamber and a liquid outlet feeding the spraying nozzles with a filtered liquid having a relatively high pressure; (e) at least one draining valve buffering between the pipe open end and the free atmosphere;

According to one preferred embodiment of the apparatus according to the present invention, the preliminary filtering chamber and the filtered liquid chamber are two compartments within one tube shape envelope, separated from each other by an inner rim parting between the coarse screen and the outer circumference of the cylindrical filter.

According to the preferred embodiment the coarse screen has a cylindrical shape, and the cylindrical coarse screen and the cylindrical filter element have similar diameters, and are positioned adjacently, forming one elongated final filtering chamber being the interior of the two adjacent cylinders. However according to the present invention the coarse screen is not limited to a cylindrical shape, to specific dimensions, or to a specific configuration relatively to the sintered filtering element, and may be shaped and positioned in any configuration useful for supplying liquid cleansed of rough particles to the sintered filtering element.

According to the preferred embodiment, the apparatus is further comprising a draining chamber encompassing the pipe open end and having a draining outlet to which connected the at least one draining valve.

Preferably the cylindrical filter element of the apparatus of the present invention is of metallic screens, providing a maximal void rate (nearly 60% more than conventional filters), thus increasing the apparatus efficiency. In addition, the sintered body better cooperates with back-washing (i.e. washing the dirt by a reverse liquid stream) than conventional filtering elements, since the screen layers constructing it are arranged progressively (the sintered body construction is comprising only screens, i.e. differently than conventional filters in that no additional support is required), thus preventing the capture of dirt particles between the screens.

According to one preferred embodiment, the controlling means for activating the cleaning system for limited periods are comprising at least one differential pressure detector (in the context of the present invention called also DP "sensor" or "gauge") for activating the cleaning system whenever the detected value of the liquid differential pressure between the final filtering chamber and the filtered liquid chamber indicates that the sintered filtering element requires a cleaning treatment.

According to various embodiments, the controlling means for activating the cleaning system for limited periods comprises a timer for activating the cleaning system periodically.

According to various embodiments the apparatus includes a by-pass switch for activating the cleaning system continuously, according to the user decision.

Preferably, the electrical motor of the cleaning system of the apparatus of the present invention is a three-phase motor and the switching arrangement for inverting the rotation direction of the motor is by changing the order of the three phase connection. However other types electrical motors may be used for driving the cleaning system, according to various customer demands, e.g. in places where a conventional AC power is not available, a DC motor energized by a solar panel may be used, and the switching arrangement for inverting the rotation direction is by inverting the DC polarity.

According to the preferred embodiment of the apparatus, the electrical motor is geared to the collector unit through a worm gear for obtaining the helical movement of the collector.

DETAILED DESCRIPTION OF THE INVENTION

The present invention will be further described by FIG. 1. This Figure is solely intend to describe one preferred embodiment of the apparatus according to the present invention, and in no manner to limit its scope.

DETAILED DESCRIPTION OF THE FIGURE

Figure 1:
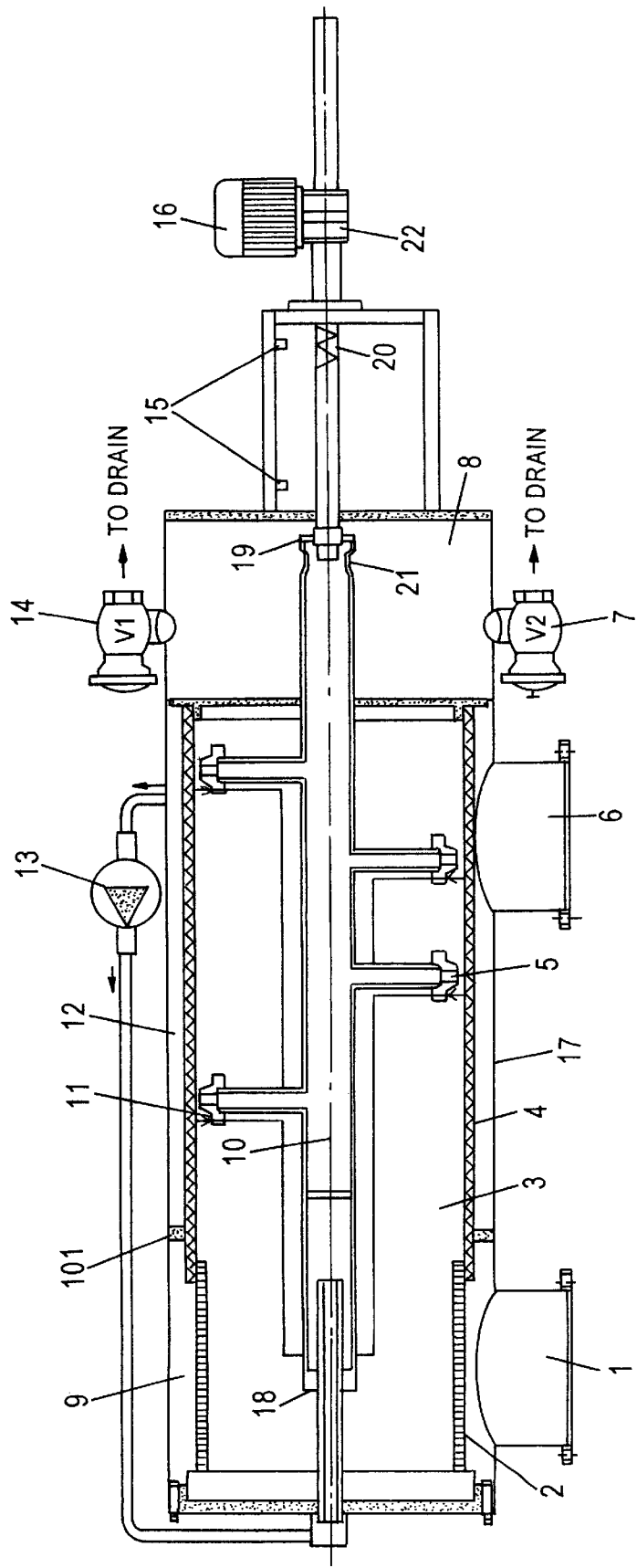
FIG. 1 illustrates a cross sectional view (made along the axis of the apparatus cylindrical shape) of the apparatus of the present invention.

FIG. 1 illustrates a continuous liquid filtering liquid filtering apparatus according to the present invention, in a cross sectional view. The apparatus is comprised of an elongated tube shape body (17) having liquid inlet (1) for a connection with a liquid supply duct (not illustrated), through which the liquid enters a preliminary filtering chamber (9). The preliminary filtering chamber is opened to a final filtering chamber (3) through a cylindrical coarse screen (2), adapted for removing rough particles from the liquid. The pre-filtered liquid which passes the coarse screen (2) flows through a cylindrical sintered filtering element (4) to the filtered liquid chamber (12) and to the liquid outlet (6) adapted for a connection with a filtered liquid duct (not illustrated). Advantageously, the preliminary filtering chamber (9) and the filtered liquid chamber (12) are two compartments within one tubeshaped envelope, separated from each other by an inner rim (101) positioned between the sintered filtering element (4) and the inner circumference of the cylindrical filter.

A hollow collector (10) having an elongated body (pipe) is located within the cylindrical filters. The collector has a plurality of pairs of a dirt suction member (5) and an adjacent spraying nozzle (11). The pairs are spaced from each other along a part of the collector length, wherein each pair extends from the collector to the inner circumference of the cylindrical sintered filtering element (4). The collector two ends (18)(19) are connected to the apparatus body (17) in a manner obtaining the collector with both "A"—rotational and "B"—back and forth sliding movements, wherein the sliding movement is restricted between a minimum point at which one pair of the suction members and spraying nozzles (the right-side one) is brought to the right end of the sintered filter (4), and between a maximum point at which one pair of the suction members and spraying nozzles (the left one) is brought to the left end of the sintered filter (4). The number of pairs of suction members and spraying nozzles and the spaces between them are designed so that by a combined rotation and sliding movements of the collector (10), the entire inner surface of the cylindrical sintered filter may be "covered" by the suction members and spraying nozzles. Such a combination of sliding and rotational movements is achieved by implementing a helical motion mechanism comprised of the 3 phase electrical motor (16) with a worm gear (22) and a screw drive (20). This mechanism drives the collector during the motor operation between the right and the left ends back and forth while simultaneously rotating, wherein the motor revolution direction is inverted whenever one of the right or the left ends are reached by the collector. Inverting the motor rotation is achieved by using limit sensors (15), which activate an electrical switching contractor for changing the order of the 3 phase connection of the motor. According to another embodiment the rotation direction is switched whenever a predetermined number of one direction motor rotations (counted by a counter) have been reached.

Simultaneously with the helical movement of the collector, a booster-pump (13) fed with liquid taken from the filtered liquid chamber (12) is generating a relatively high liquid pressure at the spraying nozzles. Thus a liquid stream is aligned from the nozzles toward the inner surface of the sintered filter, vibrating the dirt sediment and particles trapped within the porous filter. In the same time, liquid is sucked into the suction members of the collector backwashing and sweeping away the dirt from the filter. The suction operation is generated automatically by the pressure-difference between the pressure of the liquid within the filter and the pressure of the free atmosphere to which the hollow collector is opened through openings (21) near its end using as draining outlet, and through the draining chamber (8) encompassing the collector end and the draining valves (7)(14), which are in open position during the cleaning operation.

The said cleaning operation is activated according to a differential pressure (DP) sensor (gauge) (not illustrated) adapted for identifying a predetermined differential pressure between the final filtering chamber (3) and the filtered liquid chamber (12), indicating that a certain amount of sediments blocks the sintered filter, thus a cleaning operation is required. A programmable logic controller (PLC) (not illustrated) is controlling the operation of the cleaning system either for limited periods according to the DP sensor dry-contact status, or according to a timer (not illustrated) adapted for activating the cleaning system periodically for preventing sedimentation in case of the filtration of a relatively clean liquid which not activates the DP sensor occasionally. Both said DP sensor operation and timer operation modes are by-passed by a continuous-operation-switch (not illustrated) which activates the cleaning system continuously according to the user decision.

What is claimed is:

1. A continuous liquid filtering apparatus comprising:
   a cylindrical filter housing;
   a preliminary filtering chamber having a liquid inlet and an elongated coarse filtering screen;
   a final filtering chamber having a cylindrical multi-layer sintered filtering element in liquid communication with said preliminary filtering chamber across said coarse filtering screen;
   a filtered liquid chamber in liquid communication with said final filtering chamber across said sintered filtering element and having a liquid outlet; and
   an electromechanical cleaning system adapted to remove sediments from the sintered filtering element;
   wherein said elongated coarse filtering screen and said cylindrical multi-layer sintered filtering element are coaxially aligned within said housing to form an annular envelope between an inner periphery of said housing and an outer circumference of each one of said screen and said sintered filtering element such that the preliminary filtering chamber and the filtered liquid chamber are two parts of said annular envelope, separated from each other by an inner rim positioned between the sintered filtering element and the inner periphery of the cylindrical filter housing, wherein said final filtering chamber is formed within the area defined by the inner circumferences of both said screen and said sintered filtering element.

2. A continuous liquid filtering apparatus according to claim 1, wherein the cleaning system includes:
   (a) a collector unit comprising a pipe having an open end for dirt draining and positioned along the line of symmetry of the cylindrical filter, and a plurality of dirt suction members spaced from each other along the pipe length, each dirt suction member being equipped with a spraying nozzle, both suction member and nozzle extending to the inner circumference of the cylindrical filter;
   (b) a bi-directional electrical motor connected through a helical driving mechanism to said collector unit for revolving and simultaneously moving said collector unit slowly along the cylindrical filter back and forth;
   (c) a switching arrangement adapted to invert the motor rotation direction at the limits of said back and forth movement;
   (d) a booster-pump having a liquid inlet fed with filtered liquid from the filtered liquid chamber, and a liquid outlet feeding the spraying nozzles with a filtered liquid of a high pressure;
   (e) at least one draining valve buffering between the pipe open end and the free atmosphere.

3. A continuous liquid filtering apparatus according to claim 2, further comprising a draining chamber having a draining outlet connected to the at least one draining valve, said draining chamber encompasses the pipe open end.

4. A continuous liquid filtering apparatus according to claim 2, wherein the electrical motor is a three-phase motor and the switching arrangement for inverting the rotation direction of the motor is by changing the order of the three phase connection.

5. A continuous liquid filtering apparatus according to claim 2, wherein the electrical motor is a DC motor and the switching arrangement for inverting the rotation direction of the motor is by inverting the DC polarity.

6. A continuous liquid filtering apparatus according to claim 2, wherein the electrical motor is geared to the collector unit through a worm gear.

7. A continuous liquid filtering apparatus according to claim 1, wherein the coarse filtering screen has a cylindrical shape.

8. A continuous liquid filtering apparatus according to claim 7, wherein the cylindrical coarse filtering screen and the cylindrical sintered filtering element have substantially same diameters, and are positioned adjacently, forming one elongated filtration chamber being the interior of the two adjacent cylinders.

9. A continuous liquid filtering apparatus according to claim 1, further comprising at least one differential pressure detector for activating the cleaning system whenever the detected value of the liquid differential pressure reaches a predetermined value indicating that the cylindrical filter requires a cleaning treatment.

10. A continuous liquid filtering apparatus according to claim 1, further comprising a timer for activating the cleaning system periodically.

11. A continuous liquid filtering apparatus according to claim 1, further comprising a by-pass switch for activating the cleaning system continuously.

* * * * *